(12) United States Patent
Hsu

(10) Patent No.: US 6,798,173 B2
(45) Date of Patent: Sep. 28, 2004

(54) AUTOMATIC CHARGING DEVICE VIA A UNIVERSAL SERIAL BUS AND METHOD OF OPERATING THE SAME

(75) Inventor: Ying-Hao Hsu, Kaohsiung (TW)

(73) Assignee: Benq Corporation, Kweishan (TW)

( * ) Notice: Subject to any disclaimer, the term of this patent is extended or adjusted under 35 U.S.C. 154(b) by 476 days.

(21) Appl. No.: 09/790,731

(22) Filed: Feb. 21, 2001

(65) Prior Publication Data

US 2002/0038432 A1 Mar. 28, 2002

(30) Foreign Application Priority Data

Sep. 27, 2000 (TW) .................................... 89119941 A

(51) Int. Cl.⁷ ............................................ H02J 7/00
(52) U.S. Cl. .................................... 320/134; 320/128
(58) Field of Search ........................ 320/134, 128, 320/107, 110, 112, 114, 137

(56) References Cited

U.S. PATENT DOCUMENTS

| | | | | |
|---|---|---|---|---|
| 5,349,535 A | * | 9/1994 | Gupta .......................... | 702/63 |
| 5,629,605 A | * | 5/1997 | Lavan et al. .............. | 340/636.1 |
| 6,184,652 B1 | * | 2/2001 | Yang .......................... | 320/110 |
| 6,326,935 B1 | * | 12/2001 | Boger ......................... | 345/3.2 |
| 6,633,932 B1 | * | 10/2003 | Bork et al. .................. | 710/72 |

* cited by examiner

Primary Examiner—Lawrence Luk
(74) Attorney, Agent, or Firm—Ladas & Parry LLP

(57) ABSTRACT

The invention provides an automatic charging device via a USB and method of operating the same. The charging device comprises: a battery charger; an indicator; an USB interface; and a charging controller. The method of operating the charging device comprises the steps of: establishing a connection between the USB interface and the host system; providing a charging controller in the host system, wherein the charging controller obtains appropriate current from the bus-power through the connection; providing a battery charger electrically connecting the USB interface to electrify a battery; transferring data through the USB interface and electrifying a battery by the battery charger; continually adjusting the current of the bus-power to meet a maximum load current of the USB by the charging controller; showing the current of the bus-power and the rate of progress of the battery charger by an indicator in the host system; and determining whether the battery is fully charged or not, either terminating the charge as the battery is fully charged and decreasing the current to meet a minimum load current of the USB or repeating the steps of adjusting the current of the bus-power.

17 Claims, 5 Drawing Sheets

B-Type

A-Type

AUTOMATIC CHARGING DEVICE VIA A UNIVERSAL SERIAL BUS AND METHOD OF OPERATING THE SAME

BACKGROUND OF THE INVENTION

1. Field of the Invention

The invention relates to an automatic charging device via a Universal Serial Bus (USB) and method of operating the same. In particular, the invention relates to a standard USB interface, which provides data transfer and has an additional function of charging. Therefore, the automatic charging device of the invention electrifies different chargeable means with different voltages simultaneously and has the advantages of easy carrying and prolonging the power lifetime of a battery.

2. Description of the Related Art

The USB is an interface provided for improving the communication between the external peripheral device and the host system. The USB provides the end user with the functions of Plug-and-Play (PnP) and hot plugging. The USB supports two kinds of data transfer rates of 1.5 Mbps and 12 Mbps, and has hardware standard. For example, in FIG. 1, an A-type plug connects a host computer of the upstream or a hub and a B-type plug connects an external peripheral device of the downstream via a USB. Because of the convenient property of the USB, the portable means, such as a mobile phone, a digital camera, a MP3 player, etc., uses the USB as the data transfer interface. However, the great power consumption of the portable means is one big headache.

The interface of an USB comprises: a. transferring data/w external power and b. transferring data/w internal power; however the USB interface doesn't use as an interface with the functions of both charging and data transfer. Besides that, all of the portable means utilizing the USB as an interface can use the two transmitting-power pins (for example +5V and GND) in the A-type plug or the B-type plug described in FIG. 1 to transfer power, and such way of transferring power is named as a bus-power. According to one specification of a USB system, the USB can connect with 6 levels, which are up to 127 devices. However, the specification defines that one bus-power hub can not connect to another bus-power hub, and the purpose of the specification prevents the USB as an interface of the portable means connecting peripheral device from insufficient power to operate all the means. Because of the limitation of the specification, some feature of the described above USB is unable to full play. Consequently, if an USB interface can provide the functions of charge and data transfer simultaneously, the USB will solve the above problem.

SUMMARY OF THE INVENTION

An object of this invention is to solve the above-mentioned problems of the prior art by providing an automatic charging device via a USB and a method of operating the same. The invention provides a standard USB interface with the functions of charging and data transferring simultaneously, so the invention has the advantages of easy carrying and prolonging the power lifetime of a battery. The automatic charging device via an USB comprises: a battery charger electrifying the battery; an indicator showing the rate of progress; an USB interface connecting with the external peripheral device; and a charging controller utilizing a maximum charging current from a host system as a power source to electrify a battery in the battery charger via the USB interface, wherein the maximum charging current meets the maximum load current of the USB and the charging controller shows the charging current and the surplus current of the host system on a status window of the host system display. The method for electrifying peripheral device via a USB comprises the steps of: establishing an online USB between a peripheral device and a host system; obtaining a maximum current from the host system via the online USB by a charging controller; starting a battery charger and electrifying a battery by utilizing the maximum current as a power source, wherein a charging current from the power source is shown on an indicator; adjusting the charging current through the online USB to meet the maximum load current of the USB and showing both the charging current and a surplus current of the host system on a status window of a host system display; and terminating the charge as the battery is fully charged and decreasing the charging current to meet a minimum lord current of the USB otherwise repeating the step of adjusting the charging current through the USB.

In view of the above, the invention electrifies a peripheral device via the USB hardware standard. As the peripheral device connects the host system via the USB, the charging device automatically starts to charge a battery and the data is transferred from one end to another end through the USB. The invention doesn't influence the data transmission time but prolong the power lifetime of a battery.

BRIEF DESCRIPTION OF THE DRAWINGS

This and other objects and features of the invention will become clear from the following description, taken in conjunction with the preferred embodiments with reference to the drawings, in which.

DESCRIPTION OF THE PREFERRED EMBODIMENT

One feature of the invention is that a device transfers data with a host system via a USB and is electrified by the maximum power which the host system can provide simultaneously, and then the device is fully charged. Another feature of the invention is that both the data and the power are transferred through the USB interface at the same time.

Because of up to 127 devices connecting via the USB, the description of the invention is divided into the first embodiment and the second embodiment, wherein the first embodiment does not include the hub but the second embodiment.

First Embodiment

Figure 1:
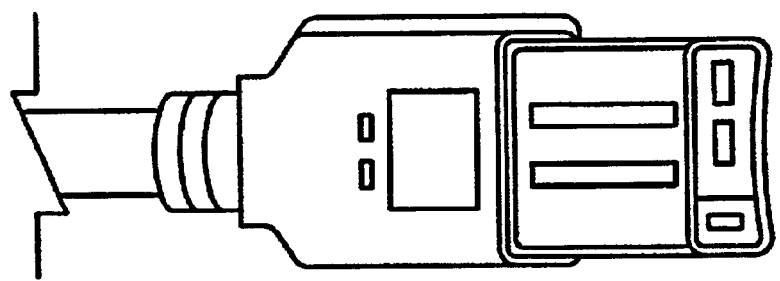
FIG. 1 shows two kinds of standard USB plug.
Figure 1:
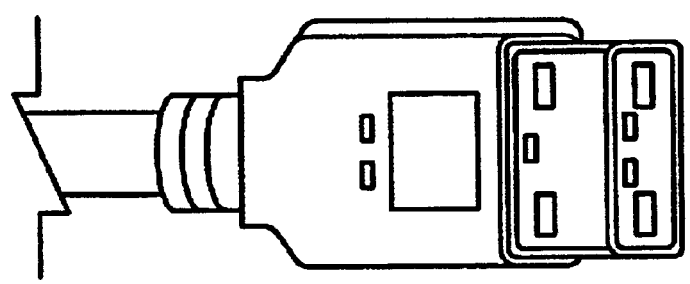
Figure 2:
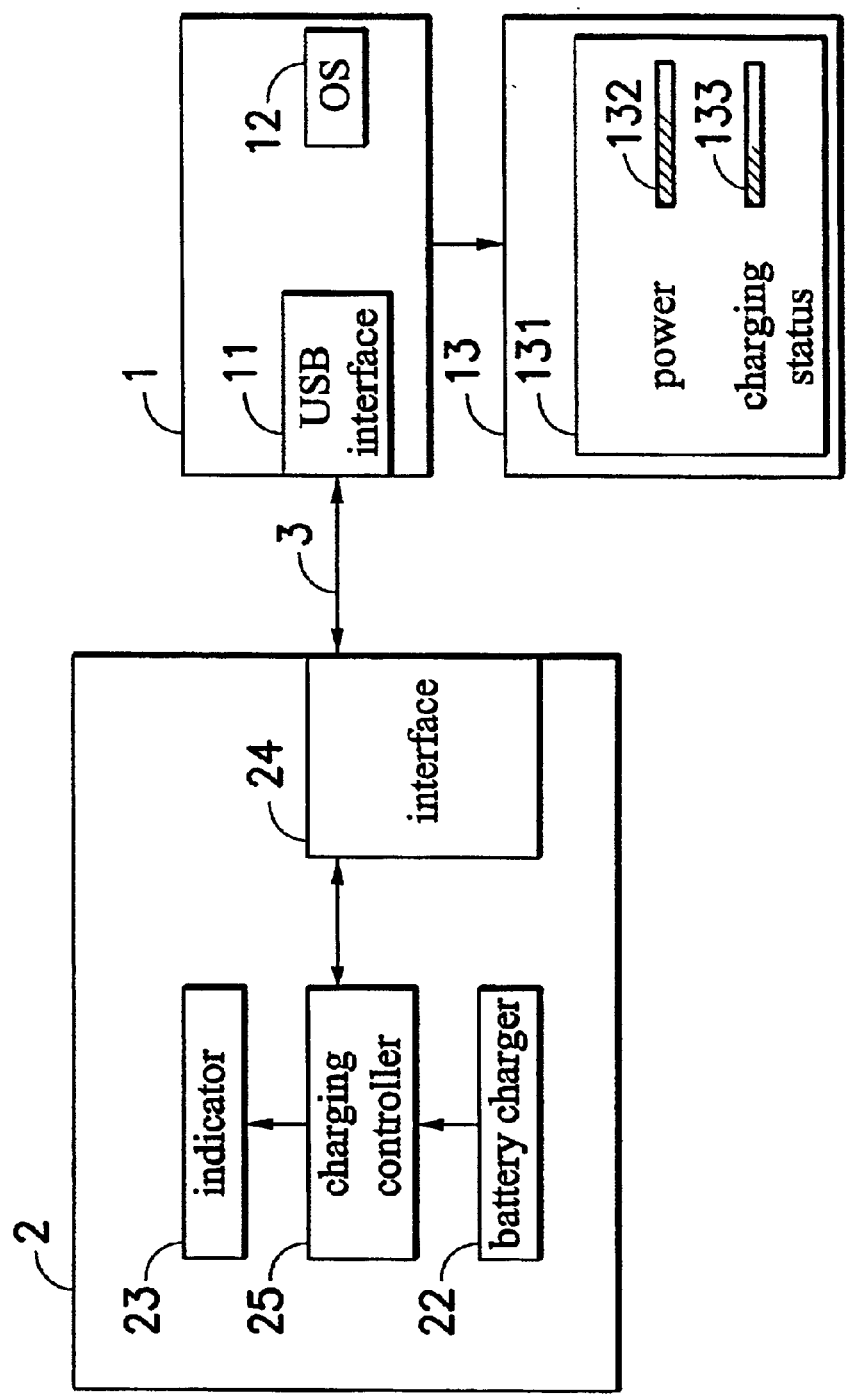
FIG. 2 is a schematic diagram of the invention showing one charging device via USB.

Referring to FIG. 2, an automatic charging device via an USB in the first embodiment of the invention includes a charging device 2, a host system 1, and an USB conductive line 3. The host system 1 further includes an USB interface 11, an operating system 12, and a status window 131 displaying on a display 13. The charging device 2 further includes a battery charger 22, an indicator 23, an USB interface, and a charging controller 25.

As shown in FIG. 2, the charging device 2 electrifies a battery. The host system 1 firstly detects the charging device 2 whether it exists or not. The host system 1 provides the charging device 2 with power, and then the charging device 2 electrifies the battery. The host system 1 connects the charging device 2 by the USB conductive line 3. The USB interface 11 is regarded as the communication interface between the host system 1 and the external peripheral device. For example, FIG. 2 shows that the data transfer between the host system 1 and the charging device 2 is established via the USB interface 11 and the USB conductive line 3. The conductive line 3 can be any kinds of conductive line, such as 1 foot coaxial cable, 5 feet twisted pair, etc., fitting the data transfer rates of the USB (such as 1.5 Mbps or 12 Mbps) and the maximum length limitation (about 5 meters). The operation system 12, such as Windows 98, later versions of Mac OS 8, UNIX system, etc., must support the USB, and controls the maximum current which provides the charging device 2 as a power source to proceed charging, wherein the maximum current is output via the USB 3. During the charge, the surplus current indicator 132 of the host system 1 and the charging current indicator 133 of the charge device 2 simultaneously show on the status window 131 of a display 13. The battery charger 22 in the charging device 2 electrifies a battery. The indicator 23 is a LCD display showing the rate of progress. The USB interface 24 is regarded as a communication interface between the charging device 2 and the peripheral devices. The charging controller 25 utilizes the maximum current provided by the host system 1 as the power source to automatically electrify a battery in the battery charger 22 via the USB interface 24. The charging controller 25 electrifies the battery by using the maximum load power of the USB. The invention provides the functions of data transferring and charging the battery at the same time. Therefore, the invention prolongs the power lifetime of a battery and utilizes a computer program to show the surplus current indicator 132 and the charging current indicator 133 on the status window 131 of the display 13 of the host system 1.

Second Embodiment

Figure 3:
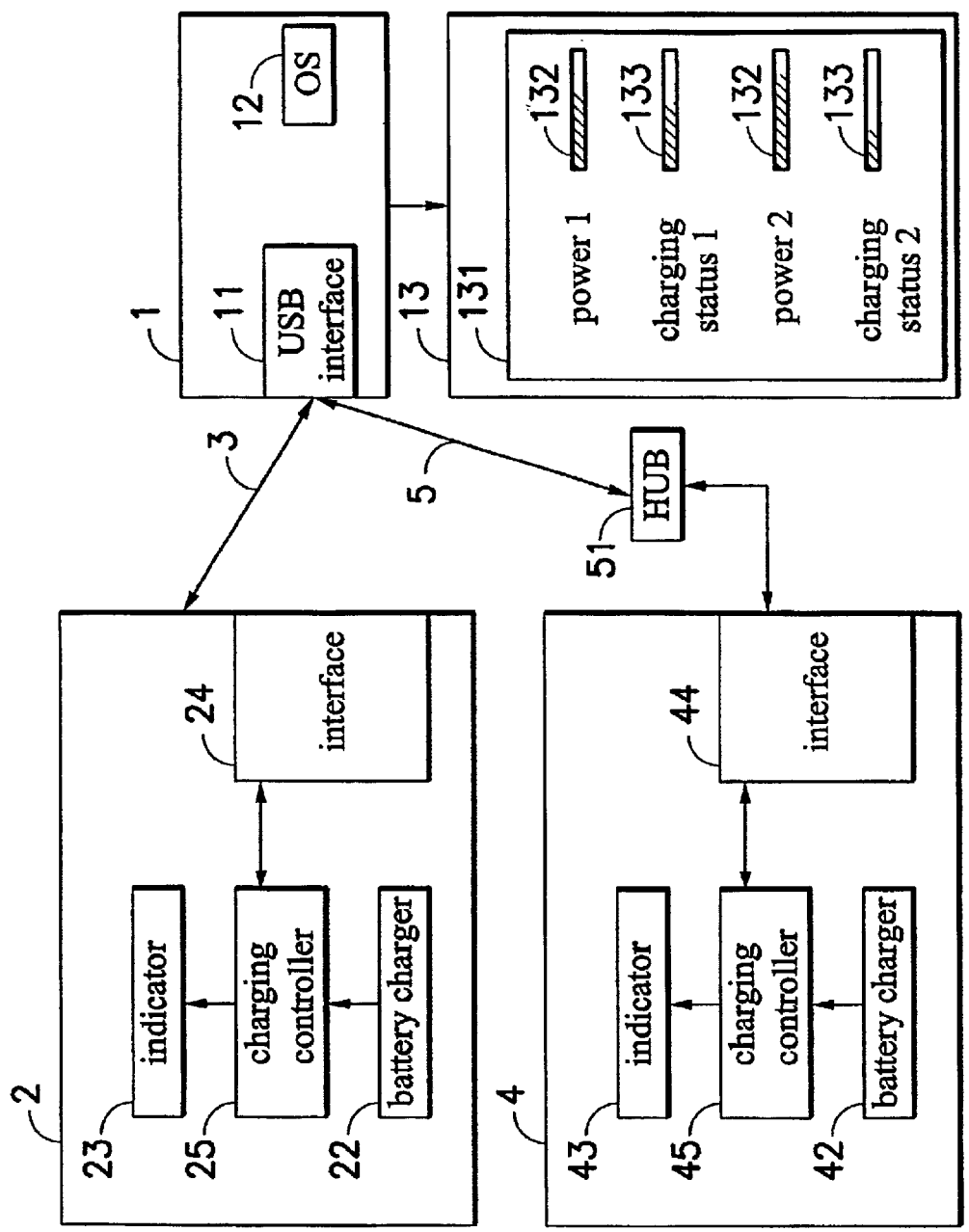
FIG. 3 is a schematic diagram of the invention showing another charging device via USB.

Referring to FIG. 3, it shows a second embodiment of another automatic charging device via an USB. In the FIG. 3, the automatic charging device includes a first charging device 2, a second charging device 4, a host system 1, a first USB conductive line 3, and a second USB conductive line 5.

As shown in FIG. 3, compare the second embodiment with the first embodiment, the second embodiment includes not only the connection via the first USB conductive line 3 between the host system 1 and the first charging device 2 but the connection via the second USB conductive line 5 and the hub 51 between the host system 1 and the second charging device 4. For example, the hub embedded in the display and the keyboard connects the host system, or a plurality of printers connects the host system via an detached-external hub. For the sake of description, this embodiment introduces only one hub 51. However, one skilled in the art knows that without departing from the definition of 7 levels and 127 devices of the USB, a USB can connect 4 devices and a detached-external hub can connect 4 to 7 devices.

Referring to FIG. 3, the connection via the first USB conductive line 3 between the first charging device 2 and the host system 1 is the same with FIG. 2. Therefore, the same parts don't describe again herein, and the others will describe in detail hereinafter.

The number of the I/O ports of the USB is typically limited at 4. If the number of the I/O ports is more than 4, the foregoing first embodiment is not appropriate to use. Therefore, a hub will introduce into the USB network. As shown in FIG. 3, in the USB network, the operation system 12 of the host system 1 automatically detects any up-to-date connection, that is, the connection via the second conductive line 5 and the HUB 51 between the host system 1 and the second charging device 4. After finding a new HUB 51 and a new charging device, the operation system 12 redistribute the power, which originally all provided for the first charging device 2, according to the required power of every devices. The redistribution is based on the degree of the required power of every device, and the device having lower degree of the required power has higher priority. For example, referring to the online connection 1-2-3 and the online connection 1-5-51-4 in FIG. 3, the host system 1 is supposed to have a surplus current 3 A. After checking the host system 1 by the operation system 12, the first charging device 2 needs 1.5 A, the HUB 51 needs 1 A, and the second charging device needs 1.5 A. Therefore, the first charging device has high priority to obtain 1.5 A by the operation system 12, the HUB 51 obtains 1 A, and the second charging device 4 obtains 0.5 A. After the first charging device 2 accomplished the charge, the operation system 12 provides the second charging device 4 with additional 1.5 A releasing from the first charging device 2. At every moment the operation system 12 examines the host system 1 and finds some useful surplus current in order to dynamically redistribute the surplus current. The operation system 12 raises the efficiency of using the power resource of the system. For example, after the first charging device 2 accomplished the charge, if the operation system 12 finds a modem added and the surplus current remains 2 A, the second charging device 4 will obtain 1 A at most.

In fact, no matter in the first embodiment or in the second embodiment of the invention, the required power of the peripherals connecting the USB can be detected. The invention carries out an optimal distribution of the power resource based on the required power. Moreover, the operation steps of the two embodiments describe hereinafter.

Flow Chart of the Operation Steps

Figure 4A:
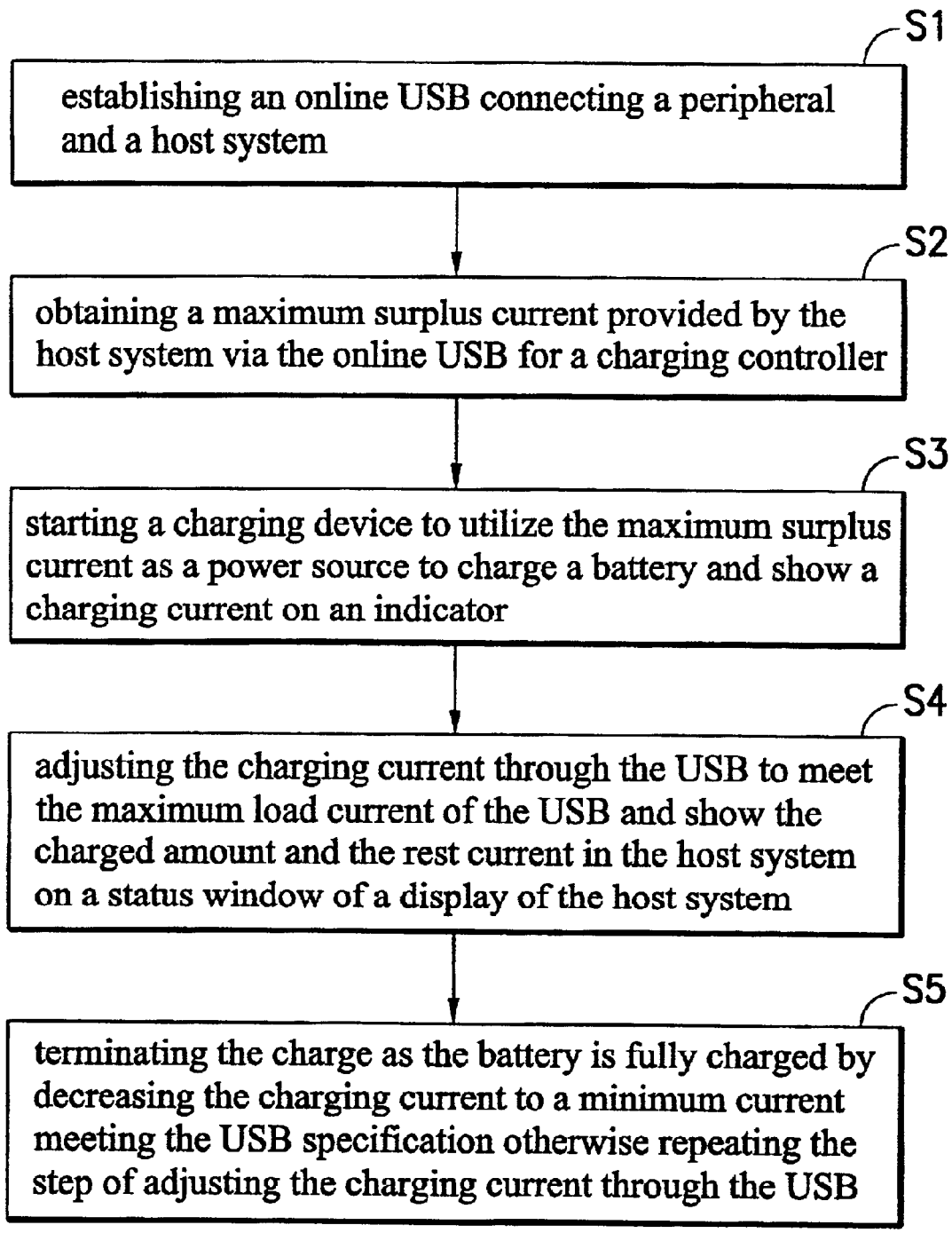
FIGS. 4a and 4b are flow charts showing the steps of operating the charging device via USB.
Figure 4B:
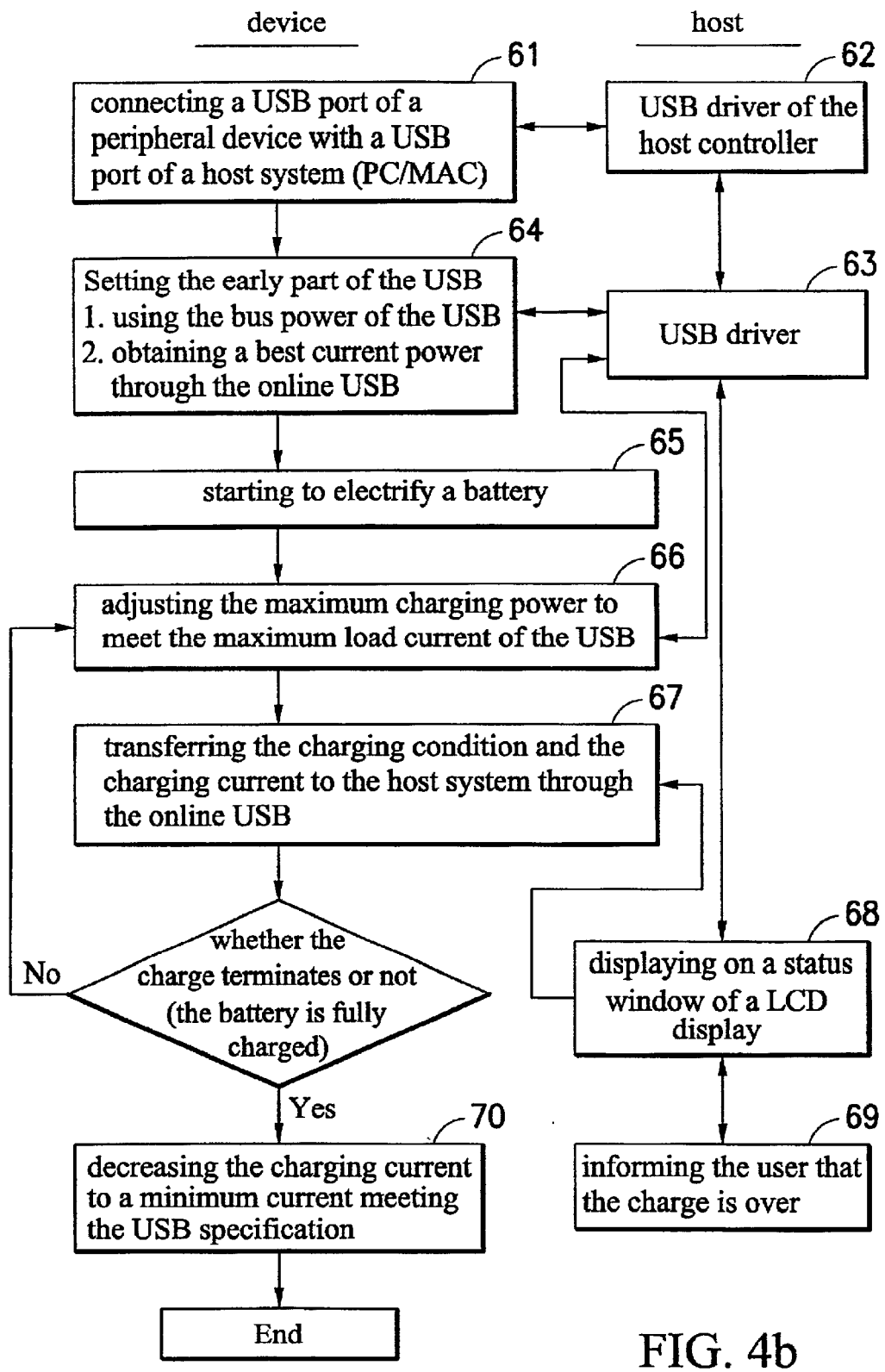

FIG. 4a and FIG. 4b show the operation steps of the automatic charging device of the invention. In FIG. 4a, the method for operating the automatic charging device comprises the steps of: establishing an online USB connecting a peripheral and a host system (S1); obtaining a maximum surplus current provided by the host system via the online USB for a charging controller (S2); starting a charging device to utilize the maximum surplus current as a power source to charge a battery and show a charging current on an indicator (S3); adjusting the charging current through the USB to meet the maximum load current of the USB and show the charged amount and the rest current in the host system on a status window of a display of the host system (S4); terminating the charge as the battery is fully charged by decreasing the charging current to a minimum current meeting the USB specification otherwise repeating the step of adjusting the charging current through the USB (S5). More detail description of the above is shown in FIG. 4b.

As shown in FIG. 4b, firstly, an online USB connecting a peripheral device and a host system (S1) is established. For example, a USB port of a peripheral device is directly connected with a USB port of a host system or indirectly connected with that via a hub by utilizing a cable line (61). The operation system in the host system immediately detects the new online device and a USB driver of the host controller controls the online operation (62). Next, an online USB (64) of the new device by the USB driver (63) provided by the operation system is established. That is, a required power of the USB port of the new device is setted as a bus-power. The host system directly provides the required power for charging through the USB and communicates with the USB driver of the host system to obtain a best current power (64) through the online USB. In another word, the maximum charging current (S2) is obtained from the host system by utilizing the bus-power of the USB. After establishing the connection (put the plug in the socket to start the USB driver of the host controller connecting the USB driver) and obtaining the maximum charging power from the host system, a charging device (65) starts to electrify a battery (S3). The maximum charging power is adjusted to meet the maximum load current of the USB (66). The charging condition and the charging current is transferred to the host system (67) through the online USB. The charging condition, the charging current and the power source of the host system are shown on a status window of a LCD display (68). In another word, the step S4 in FIG. 4a includes the steps 66, 67 and 68 in FIG. 4b. As the battery is fully charged, the charging current is decreased to a minimum current meeting the USB specification (70) and the system inform the user (69). Otherwise, the steps 66, 67 and 68 are repeated. The maximum load current of the USB and the minimum current meeting the USB specification mentioned above is determined by the amount and the type of the peripheral device.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. An automatic charging device having a USB interface which connects to a host system that has a bus-power to provide the automatic charging device with a current, comprising:
   a battery charger connected to the USB interface for charging a battery;
   an indicator associated with the host system and showing a rate of progress; and
   a charging controller adjusting the current of the bus-power to inhibit exceeding the maximum load current of the USB, wherein the charging controller is controlled by the host system;
   wherein the host system comprises:
   an operating system detecting whether the charging device exists or not;
   a USB interface communicating with the charging device and receiving a data of rate of progress from the charging device; and
   a status window of a display showing the data of rate of progress.

2. An automatic charging device as claimed in claim 1, further comprising a conductive line connecting the USB interface of the charging device and the USB interface of the host system.

3. An automatic charging device as claimed in claim 2, wherein the conductive line is a cable line being able to transfer data.

4. An automatic charging device as claimed in claim 1, further comprising a power socket carrying an electrical charge to the battery.

5. An automatic charging device as claimed in claim 1, where in the charging controller adjusts the current of the bus-power to meet the maximum load current of the USB.

6. An automatic charging device having a USB interface which connects to a host system, that has a bus-power to provide the automatic charging device with a current, through a hub comprising:
   a battery charger connected to the USB interface for charging a battery;
   an indicator associated with the host system and showing a rate of progress; and
   a charging controller controlled by the host system to adjust the current of the bus-power to inhibit exceeding the maximum load current of the USB, wherein as the indicator shows the battery is fully charged, the charging controller sends a signal to decrease the current of the bus-power to a minimum current meeting the minimum load of the USB and stops the battery charger;
   wherein the host system comprises:
   an operating system detecting whether the charging device exists or not;
   a USB interface communicating with the charging device and receiving a data of rate of progress from the charging device; and
   a status window of a display showing the data of rate of progress.

7. An automatic charging device as claimed in claim 6, wherein the conductive line is a cable line being able to transfer data.

8. An automatic charging device as claimed in claim 6, further comprising a power socket carrying an electrical charge to the battery.

9. An automatic charging device as claimed in claim 6, wherein the charging controller controlled by the host system to adjust the current of the bus-power to meet the maximum load current of the USB.

10. A method of operating an automatic charging device via a universal serial bus, having a USB interface which has a bus-power to provide thereof with a current, comprising the steps of:
   (a) establishing a connection between the USB interface and the host system;

(b) providing a charging controller in the host system, wherein the charging controller obtains appropriate current from the bus-power through the connection;

(c) providing a battery charger electrically connecting the USB interface to electrify a battery;

(d) transferring data through the USB interface and electrifying a battery by the battery charger;

(e) continually adjusting the current of the bus-power to meet a maximum load current of the USB by the charging controller;

(f) showing the current of the bus-power and the rate of progress of the battery charger by an indicator in the host system; and (g) determining whether the battery is fully charged or not, either terminating the charge as the battery is fully charged and decreasing the current to meet a minimum load current of the USB or repeating the steps (c) to (f).

11. A method of operating an automatic charging device via a universal serial bus as claimed in claim 10, wherein the maximum load current of the USB and the minimum load current of the USB is determined by the types and the quantities of the online peripherals.

12. A method of operating an automatic charging device via a universal serial bus as claimed in claim 10, wherein the step (a) further comprises:

directly connecting the USB interface of the charging device with the USB interface of the host system by utilizing a cable or connecting the USB interface of the charging device with the USB interface of the host system through a hub by utilizing a cable;

detecting a new online device by the operation system in the host system;

setting up a USB driver; and using the bus-power of the USB as a power source for charge by setting the charging controller at the USB port of the charging device.

13. An automatic charging device having a computer interface which connects to a host system that has a bus-power to provide the automatic charging device with a current, comprising:

a battery charger connected to the computer interface for charging a battery;

an indicator associated with the host system and showing a rate of progress; and a charging controller adjusting the current of the bus-power to inhibit exceeding the maximum load current of the computer interface, wherein the charging controller is controlled by the host system via said computer interface;

wherein the host system comprises:

an operating system detecting whether the charging device exists or not;

the computer interface communicating with the charging device and receiving a data of rate of progress from the charging device; and a status window of a display showing the data of rate of progress.

14. An automatic charging device as claimed in claim 13, further comprising a conductive line connecting the computer interface of the charging device and the computer interface of the host system.

15. An automatic charging device as claimed in claim 14, wherein the conductive line is a cable line being able to transfer data.

16. An automatic charging device as claimed in claim 13, further comprising a power socket carrying an electrical charge to the battery.

17. An automatic charging device as claimed in claim 13, wherein the charging controller adjusts the current of the bus-power to meet the maximum load current of the computer interface.

* * * * *